UNITED STATES PATENT OFFICE.

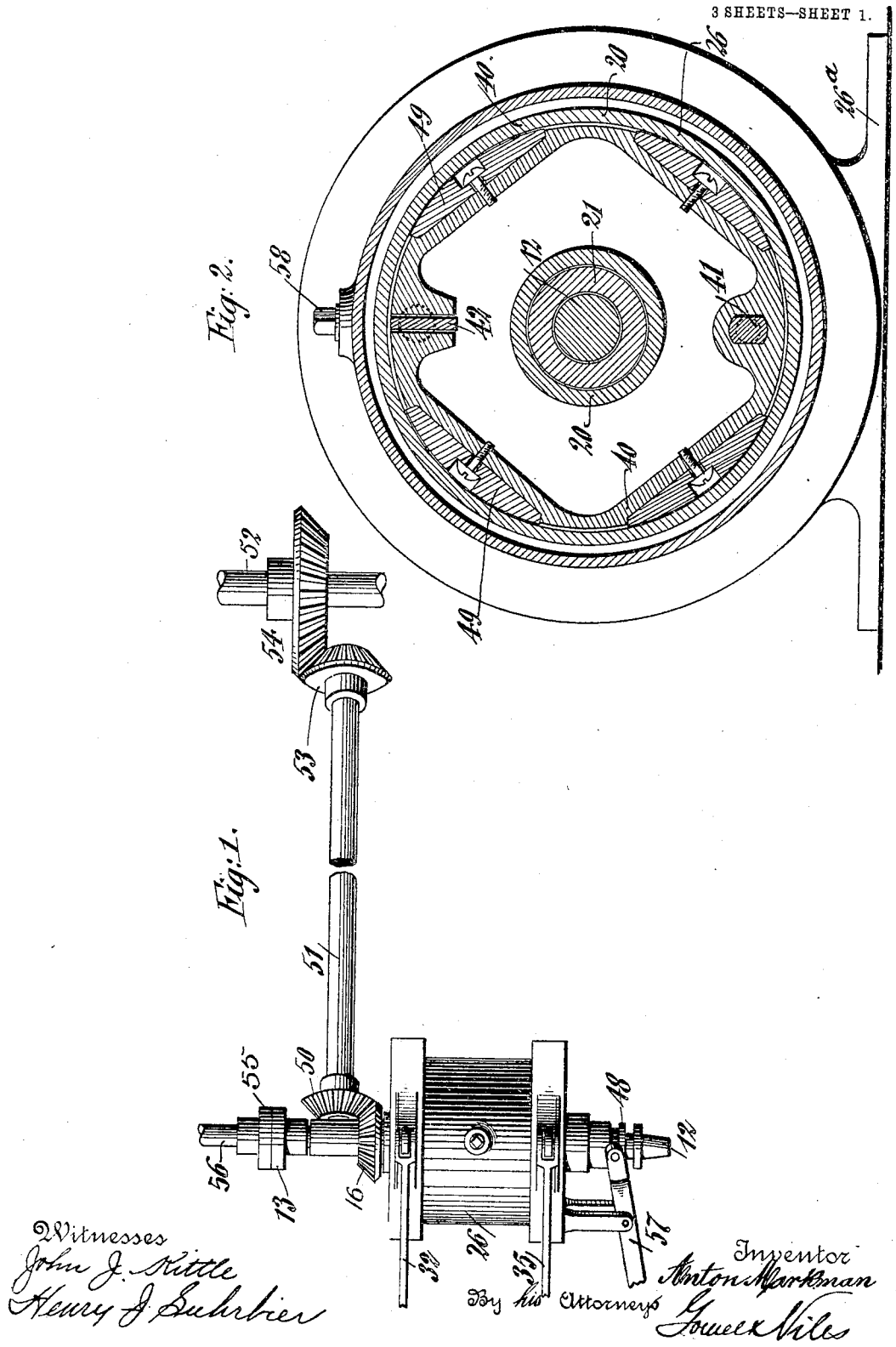

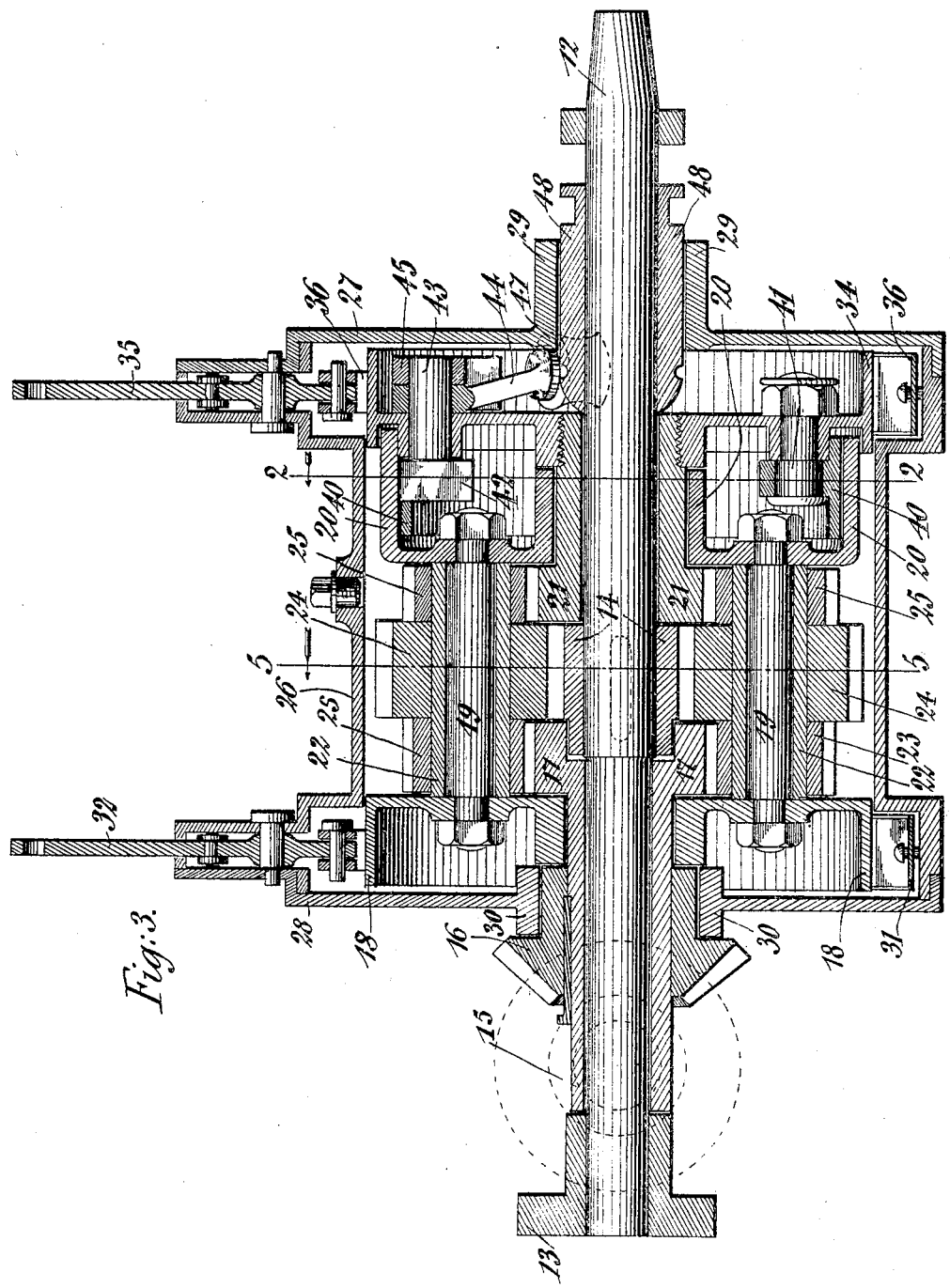

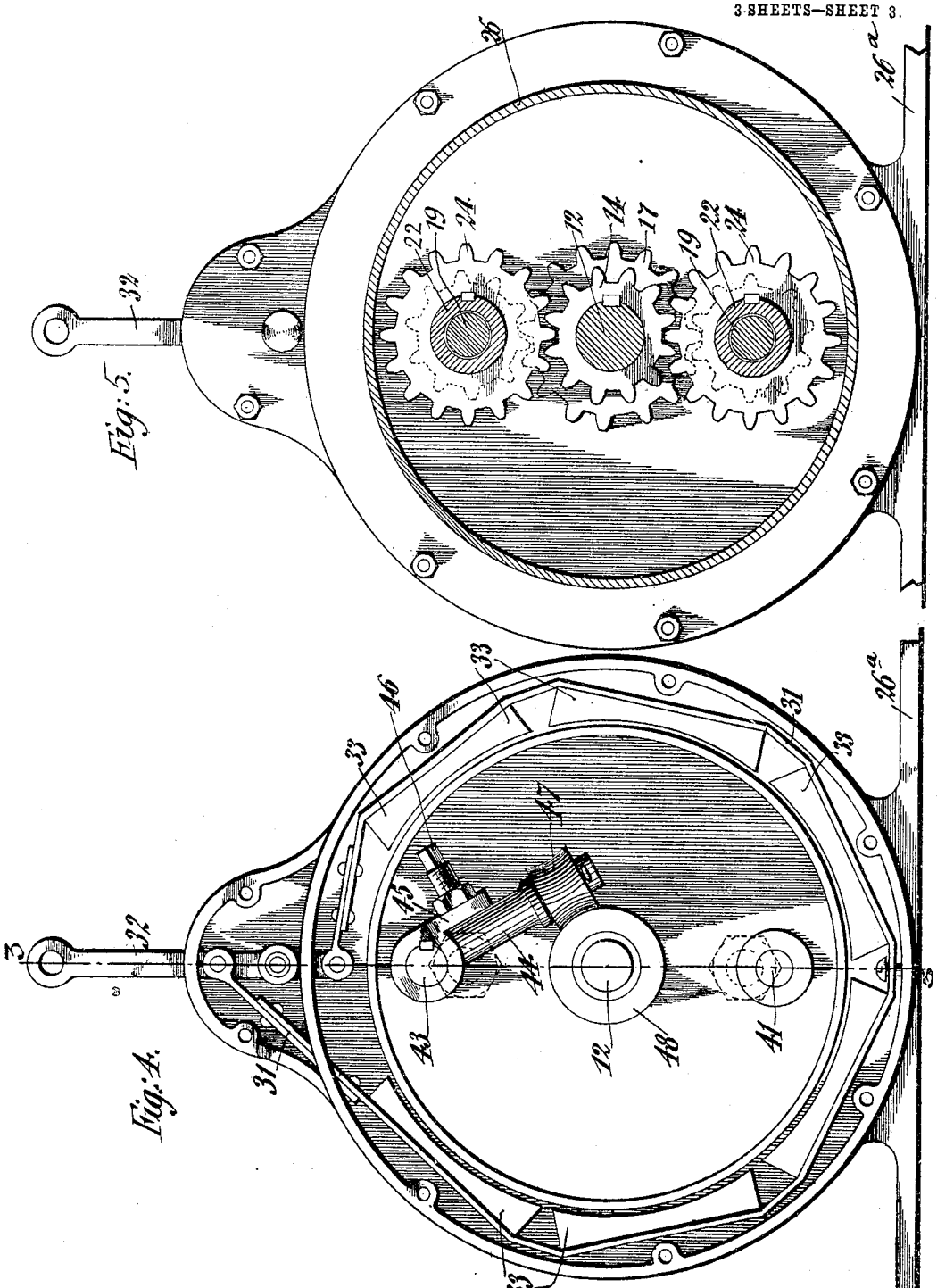

ANTON MARKMAN, OF JERSEY CITY, NEW JERSEY.

MOTION TRANSMITTING AND REVERSING GEAR.

No. 795,530.     Specification of Letters Patent.     Patented July 25, 1905.

Application filed December 19, 1903. Serial No. 185,810.

*To all whom it may concern:*

Be it known that I, ANTON MARKMAN, a citizen of the United States, residing in Jersey City, in the county of Hudson and State of New Jersey, have invented certain new and useful Improvements in Motion Transmitting and Reversing Gears, of which the following is a specification.

This invention relates to means for transmitting motion especially adapted for use with engines of motor-vehicles where the engine will not start under load, but must be run free until brought up to speed and then gradually connected with the driving-wheels.

The object of the invention is to provide an improved means for transmitting motion from a shaft running at a certain speed to another shaft or gear, whereby the latter will rotate either at a different speed or the same speed or else will rotate in a reverse direction; and for this purpose the invention consists of a motion transmitting and reversing gear of which the novel features and combinations of parts will be clearly described in the following specification and recited in the appended claims.

In the accompanying drawings, Figure 1 is a plan view of my improved motion transmitting and reversing gear arranged on a motor-vehicle. Fig. 2 is a vertical transverse section on line 2 2, Fig. 3. Fig. 3 is a vertical longitudinal section on line 3 3, Fig. 4. Fig. 4 is an end view with the head of the casing removed; and Fig. 5 is a vertical transverse section on line 5 5, Fig. 3.

Similar characters of reference indicate corresponding parts.

In the drawings, 12 is the main shaft of my improved motion transmitting and reversing gear, which shaft is connected with the crank-shaft 56 of the explosion or other motor by a coupling, one member, 55, of which is attached to the crank-shaft 56 and the other member, 13, to the main shaft 12 of the transmitting-gear. To the shaft 12 is keyed a gear 14, and between this gear and the coupling 13 55 is located a loose sleeve 15, which is provided at its inner end with a gear-wheel 17 adjacent to the gear-wheel 14 and at its middle portion with a bevel-gear 16, suitably keyed thereto, said bevel-gear meshing with a bevel-gear 50 on an intermediate shaft 51, that leads from the main shaft 12 to the rear axle 52 and imparts rotary motion to the same by bevel-gear transmission 53 54, as shown in Fig. 1. On the sleeve 15 is mounted between the gears 16 17 a disk 18, which is provided with a circumferential flange, said disk being adapted to turn loosely on the sleeve 15, but being held against longitudinal shifting motion by the gear 17 and the hub of the bevel-gear 16. Adjacent to the gear-wheel 14 is placed loosely on the shaft 12 a gear-wheel 21, on the hub of which is placed a second disk 20, which is of slightly less diameter than the disk 18 and is provided with a circumferential flange extending in opposite direction to the flange of the latter disk. The disks 18 and 20 are connected at diametrically opposite points by short shafts 19, which are provided with shoulders adjacent to said disks and with ends of smaller diameter that pass through the holes of the disks 18 and 20 and are secured to the same by screw-nuts turned home on the threaded ends of the shafts 19, as shown clearly in Fig. 3. On each of the shafts 19 is placed a loose sleeve 22, to which are keyed alongside of each other gears 23, 24, and 25, the gear 23 meshing with the gear 17, the gear 24 meshing with the gear 14, and the gear 25 meshing with the gear 21. The gear 24 is larger than the gear 14, while the gear 23 is smaller than the gear 17, with which it is in mesh.

The hub of the gear 21 is provided with an exterior screw-thread, to which is screwed a disk 34, which is also provided, like the disk 18, with a circumferential flange, the disk 34 being of the same diameter as the disk 18. The disks 18, 20, and 34 and the gears arranged between the same are inclosed by a cylindrical casing 26, which is provided with stationary heads 27 and 28, the hubs 29 and 30 of which form journal-bearings for a cone-sleeve 48 at one end of the shaft and for the hub of the bevel-gear 16 near the opposite end of the main shaft 12. The casing 26 is attached at its lower part to a stationary base-plate 26ª. At one end of the casing 26 are arranged in contact with the circumferential flange of the disk 18 a number of friction-blocks 33 of a brake 31, the band of which passes around the flange of said disk and has its ends pivoted to a lever 32 at opposite sides of its fulcrum, which is located in an upward extension of the casing 26, as shown in Figs. 3, 4, and 5. When the lever 32 is actuated, the brake-band will be contracted and the friction-blocks 33 applied to the flanged disk 18, so as to grip the same tightly and prevent it from rotating under the influence of the rotary shaft 12 and the transmitting-gears. The flanged disk 34 is also engaged by a brake, which comprises a brake-band similar to that of the brake acting on the disk 18, said brake comprising a fulcrumed lever 35, a brake-band 36, pivoted thereto at opposite sides of its fulcrum, and friction-blocks 37, which are applied to the brake-band in the same manner as the friction-blocks 33 of the brake 31.

To the disk 34 is secured a ring 40 by a bolt 41 at the lower part of the same, said ring being split at a point diametrically opposite to the bolt 41 and engaged by the flattened part 42 of a bolt 43, that is pivoted to the disk 34 and passes through a hole of the same. An arm 44 is placed loosely on the bolt 43 and adjustably connected therewith by a short crank 45, that is keyed to the end of the bolt 43, said crank being provided with an adjusting-screw 46, that passes through it and that is tapped into the arm 44. The free lower end of the arm 44 carries a concave roller 47, that bears on the conical end of the sleeve 48, that is placed loosely on the shaft 12. The sleeve 48 is provided at its outer end, outside of the journal-bearing 29 of the head 27, with a circumferential groove, that is engaged by the forked end of a lever 57, that is fulcrumed to the head 27, as shown in Fig. 1. When the cone-sleeve 48 is moved inwardly by the lever 57, it will move the arm 44 in upward direction and expand the ring 40 by reason of the flat part 42 of the bolt 43 being interposed between the split ends of the ring 40. The ring is provided with friction-blocks 49, of fibrous material, which are seated in recesses of the ring 40 and serve to bind tightly against the inner circumference of the flanged disk 20 when the ring 40 is expanded.

When it is desired to rotate the rear axle at the same high speed as the crank-shaft of the motor, the cone-sleeve 48 is moved inwardly, so as to apply the blocks of the friction-ring 40 and lock them to the inner circumference of the flanged disk 20. As the disk 34 is rigidly connected with the gear 21, this gear will be held stationary in relation to the disk 20 and the disk 18, which is connected by the shafts 19 to the disk 20. Consequently the three gears on the short shafts 19 will be prevented from rotating on the shafts, and the rotation of the gear 14 will cause the disk 18 to be carried around as if it were fast on the shaft 12. As the gears 24 mesh with the gear 14 and the gear 27 meshes with the gear 17, the latter will be rotated also with the shaft, so that the bevel-gear 16 on the sleeve of the gear-wheel 17 will rotate at the same speed as the shaft, and consequently transmit the speed of the motor or "high speed" to the rear axle. When the motion of the rear axle is to be arrested, the cone-sleeve is withdrawn by the action of the lever 57, so that the arm 44, with its roller 47, is permitted to drop down and release thereby the expanding action on the split end of the ring 40, so that instantly the clutch action on the disk 20 is released and the transmission of motion to the bevel-gear 30 and the rear axle interrupted.

When it is desired to reduce the speed of the rear axle 52, the lever 32 is actuated and the brake applied to the disk 18. This action will hold the disk 18 in stationary position, so that the rotation of the shaft 12 and gear 14 will cause the gear 24 to rotate and transmit by the gears 23 and 17 rotary motion to the wheel 15 and bevel-gear 16 and from the same to the rear axle. As the gear 24 is larger than the gear 14 and the gear 17 larger than the gear 23, the speed of the wheel 15 and bevel-gear 16 is considerably reduced, and thereby slow speed imparted to the rear axle. When the brake is released from the disk 18, the resistance offered to the bevel-gear 16 will tend to retain the same in fixed position, so that the gears 14 and 24 will cause the gears 23 to have an epicycloidal movement around the gear 17, while the disk 18 will rotate slowly in the opposite direction without transmitting motion to the bevel-gear 16, so that consequently no motion is transmitted to the rear axle.

When it is desired to reverse the motion of the rear axle, the lever 25 is actuated, and thereby the brake applied to the circumferential flange of the disk 34. This will lock the disk 34, so that consequently the gear 21 will be held in fixed position, while the rotation of the gears 14 and 24 will cause the gear 25 to describe an epicycloidal movement around the gear 21, so that the disk 18 will rotate in an opposite direction to the rotation of the shaft 12 and gear 14, as the gears 23 are smaller than the gears 25, while the gear 17, around which the gears 23 rotate, is larger than the narrow stationary gear 21, the gear 17 will rotate in the same direction as that in which the carrying member 18 is rotating—that is to say, it will be slowly rotated in a direction opposite to that of the shaft 12, so that the bevel-gear 16 will reverse by the intermediate transmitting-shaft the motion of the rear axle 52. On releasing the brake operated by the lever 35 the slow reversing motion transmitted to the rear axle is interrupted, all the gear-wheels on the shafts 19 rotating then around the gear-wheel 14 without transmitting any motion to the bevel-gear 16.

All the interior parts except the cone-sleeve 48 and the bevel-gear 16 are inside of the casing and run in oil, which is admitted by an oil-hole in the top of the casing, closed by a screw-plug 58, all the working parts being thereby thoroughly lubricated and protected from dust and dirt and against undue friction and wear of the parts. By actuating the levers 57, 32, and 35 as required either high speed or low speed is transmitted to the rear axle or the motion of the same reversed, all the parts working easily in a reliable manner by the actuations of these levers.

Having thus described my invention, I claim as new and desire to secure by Letters Patent—

1. In a motion transmitting and reversing device, the combination, with a main shaft, of a gear fixed thereon, sleeves rotatable on said shaft, gears on each of said sleeves, a bevel-gear keyed to the outer end of one of said rotatable sleeves, a carrying member comprising spaced disks rotatable on said shaft-sleeves and provided with peripheral outwardly-extending flanges, stud-shafts between said disks, gears carried by said stud-shafts and meshing with said shaft-gear and the gears on said shaft-sleeves, a third disk in proximity to one of the disks of said carrying member and fixed to one of said shaft-sleeves, said third disk being also provided with an outwardly-extending peripheral flange, a friction-clutch carried by said third disk for locking it into engagement with the contiguous disk of the carrying member, brakes engaging the outwardly-extending flanges of the opposite disk of the carrying member and of said third disk, and means for actuating the different brakes and clutch so as to transmit high or slow speed to the main shaft in one direction or slow speed in the opposite direction.

2. In a motion transmitting and reversing device, the combination, with a main shaft, of a drive-gear fixed thereon, sleeves rotatable on said shaft, gears on each of said sleeves, a bevel-gear keyed to the outer end of one of said sleeves, a carrying member comprising spaced disks rotatable on said shaft-sleeves and provided with peripheral outwardly-extending flanges, stud-shafts extending between said disks, triple gears turning loosely in said stud-shafts and meshing with the drive-gear on the main shaft and with the gears on said shaft-sleeves, a third disk in proximity to one of the disks of said carrying member also provided with a peripheral flange extending in the same direction as the flange on the adjacent disk, a friction-clutch carried by said third disk for locking the same into engagement with the adjacent disk of the carrying member, brakes engaging the outwardly-extending flange of the opposite disk of the carrying member and the flange of said third disk, means for actuating said brakes and clutch, and a casing surrounding said disks and internal transmitting-gears and having heads provided respectively with journal-casings for the exterior bevel-gear and the actuating mechanism of the friction-clutch supported on said third disk.

In testimony that I claim the foregoing as my invention I have signed my name in presence of two subscribing witnesses.

ANTON MARKMAN.

Witnesses:
PAUL GOEPEL,
HENRY J. SUHRBIER.